US012578258B2

(12) United States Patent
Badin et al.

(10) Patent No.: US 12,578,258 B2
(45) Date of Patent: Mar. 17, 2026

(54) OPTICAL SENSOR PARTICULATE CLASSIFICATION USING OPTICAL RESPONSE SIGNAL ANALYSIS

(71) Applicant: Honeywell International s.r.o., Chodov (CZ)

(72) Inventors: Pavel Badin, Brno (CZ); Viktor Drazan, Brno (CZ); Jan Popelka, Neslovice (CZ)

(73) Assignee: Honeywell International s.r.o. (CZ)

( * ) Notice: Subject to any disclaimer, the term of this patent is extended or adjusted under 35 U.S.C. 154(b) by 117 days.

(21) Appl. No.: 18/679,107

(22) Filed: May 30, 2024

(65) Prior Publication Data

US 2025/0369859 A1 Dec. 4, 2025

(51) Int. Cl.
*G01S 17/00* (2020.01)
*G01N 15/14* (2006.01)
(Continued)

(52) U.S. Cl.
CPC ..... *G01N 15/1429* (2013.01); *G01N 15/1459* (2013.01); *G01N 15/1492* (2024.01)

(58) Field of Classification Search
CPC ... G01S 7/00; G01S 7/48; G01S 7/484; G01S 7/486; G01S 17/00; G01S 17/88; G01S 17/931; G01S 17/933
See application file for complete search history.

(56) References Cited

U.S. PATENT DOCUMENTS

| | | |
|---|---|---|
| 11,709,124 B2 | 7/2023 | Wienkes et al. |
| 11,754,484 B2 | 9/2023 | Fan et al. |

(Continued)

FOREIGN PATENT DOCUMENTS

| | | | |
|---|---|---|---|
| EP | 3096130 A2 | 11/2016 | |
| KR | 20220059077 A | 5/2022 | |
| KR | 102467875 B1 | 7/2022 | |
| WO | WO-2022036127 A1 * | 2/2022 | ........... G01S 17/931 |

OTHER PUBLICATIONS

AMS, "The Mathematics of Rainbows", Feature Column from the AMS, posted Feb. 2009 on https://www.ams.org/publicoutreach/feature-column/fcarc-rainbows, pp. 1 through 61.

(Continued)

*Primary Examiner* — Abdullahi Nur

(74) *Attorney, Agent, or Firm* — Fogg & Powers LLC

(57) ABSTRACT

A system comprises a particle sensor for a vehicle comprising a light source that directs a beam to an interrogation region outside the vehicle; and an optical detector that receives scattered or reflected light from an aerosol particle in the interrogation region. A processor performs a method for particle classification comprising measuring an optical response from a single particle in the interrogation region by identifying an optical response peak for scattered or reflected light from the interrogation region; measuring an amplitude and duration of the optical response peak; correcting the duration of the optical response peak based on a vehicle airspeed; based on the measured amplitude of the optical response peak, generating an expected optical response duration for water droplet using a calibration table; analyzing the measured optical response duration and the expected optical response duration to determine particle classification; and generating classification probabilities for one or more particle types.

20 Claims, 10 Drawing Sheets

100

(51) Int. Cl.
G01N 15/1429 (2024.01)
G01N 15/1492 (2024.01)

(56) References Cited

U.S. PATENT DOCUMENTS

| | | |
|---|---|---|
| 2014/0330459 A1 | 11/2014 | Baumgardner et al. |
| 2019/0324051 A1 | 10/2019 | Wienkes et al. |
| 2020/0066170 A1 | 2/2020 | Garde |
| 2020/0284883 A1* | 9/2020 | Ferreira ................ G01S 7/4815 |
| 2021/0181080 A1 | 6/2021 | Zhang et al. |

OTHER PUBLICATIONS

Baldo et al., "Complex refractive index and single scattering albedo of Icelandic dust in the shortwave part of the spectrum", Atmospheric Chemistry and Physics, vol. 23, Jul. 18, 2023, pp. 7975 through 8000.

Gigahertz-Optik, "Reflection, Transmission and Absorption", as downloaded Apr. 29, 2024 from https://www.gigahertz-optik.com/en-us/service-and-support/knowledge-base/basics-light-measurement/light-color/reflec-trans-abs/, pp. 1 through 3.

Grainger et al., "Measuring Volcanic Plume and Ash Properties from Space", Downloaded from http://sp.lyellcollection.org/ at Oxford University on Jul. 9, 2013, pp. 1 through 28.

Li, "Growth and Melting of Atmospheric Ice Particles: Insights from Radar Observations", Thesis, Jan. 2021. Institute for Atmospheric and Earth System Research / Physics, Faculty of Science, University of Helsinki, Helsinki, Finland, pp. cover through 43.

Lindqvist et al., "Single Scattering by Realistic, Inhomogeneous Mineral Dust Particles with Stereogrammetric Shapes", Atmospheric Chemistry and Physics, vol. 14, Jan. 6, 2014, pp. 143 through 157.

Mitchell et al., "Cirrus Clouds and Climate Engineering: New Findings on Ice Nucleation and theoretical Basis", Planet Earth 2011—Global Warming Challenges and Opportunities for Policy and Practice, InTech, Sep. 2011, pp. 257 through 288.

NASA, "The Shape of a Raindrop", NASA Global Precipitation Measurement Mission, as downloaded Apr. 29, 2024 from https://gpm/nasa.gov/resources/sturdents-and-educators/the-shopeof-a-raindrop, pp. 1 through 3.

Osela Inc., "Top Hat Beam Shaper", Structured Light and Laser Beam Shaping Solutions, as downloaded Apr. 29, 2024 from osela.com, pp. 1 through 3.

Stuke, "Characterizing thin clouds using aerosol optical depth information", Master's Thesis, submitted to the Faculty of Geo- and Atmospheric Sciences of the University of Innsbruck, Nov. 2016, pp. cover through 77.

U.S. National Park Service, "Volcanic Ash, Tephra Fall and Fallout Deposits", as downloaded May 29, 2024 from https://www.nps.gov/articles/000/volcanic-ash-tephra-fall-and-fallout-deposits.htm, pp. 1 through 18.

Umo et al., "The Influence of Chemical and Mineral Compositions on the Parameterization of Immersion Freezing by Volcanic Ash Particles", JGR Atmospheres, Research Article, Aug. 6, 2021, pp. 1 through 27.

Cerni, "Determination of the Size and Concentration of Cloud Drops with an FSSP", Journal of Climate and Applied Meteorology, Aug. 1, 1983, vol. 22, pp. 1346 through 1355.

European Patent Office, "Extended European Search Report", dated Jul. 24, 2025, from EP Application No. 25161806.2, from Foreign Counterpart to U.S. Appl. No. 18/679,107, pp. 1 through 6, Published: EP.

* cited by examiner

200

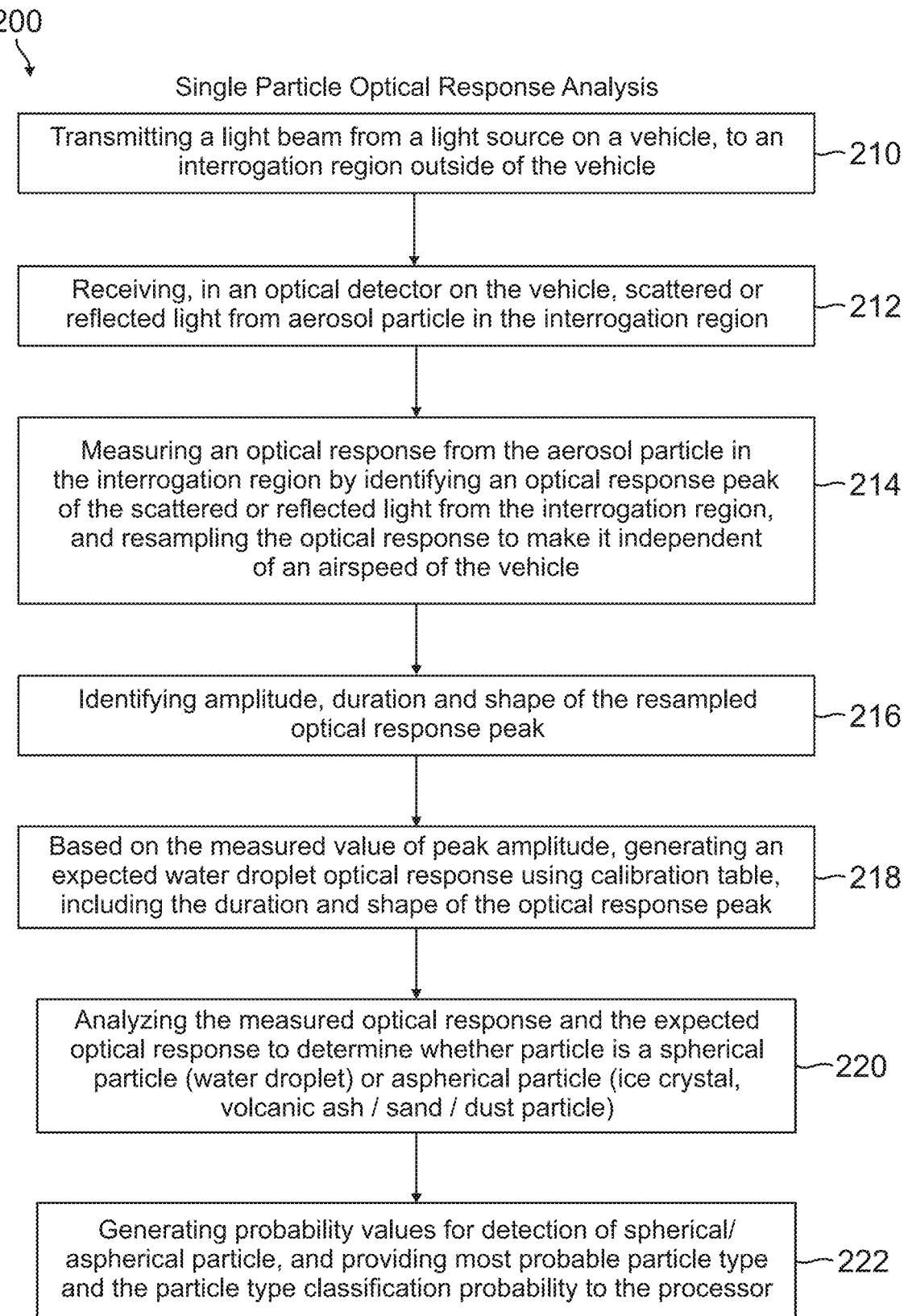

Single Particle Optical Response Analysis

Transmitting a light beam from a light source on a vehicle, to an interrogation region outside of the vehicle ⌐210

Receiving, in an optical detector on the vehicle, scattered or reflected light from aerosol particle in the interrogation region ⌐212

Measuring an optical response from the aerosol particle in the interrogation region by identifying an optical response peak of the scattered or reflected light from the interrogation region, and resampling the optical response to make it independent of an airspeed of the vehicle ⌐214

Identifying amplitude, duration and shape of the resampled optical response peak ⌐216

Based on the measured value of peak amplitude, generating an expected water droplet optical response using calibration table, including the duration and shape of the optical response peak ⌐218

Analyzing the measured optical response and the expected optical response to determine whether particle is a spherical particle (water droplet) or aspherical particle (ice crystal, volcanic ash / sand / dust particle) ⌐220

Generating probability values for detection of spherical/ aspherical particle, and providing most probable particle type and the particle type classification probability to the processor ⌐222

FIG. 2

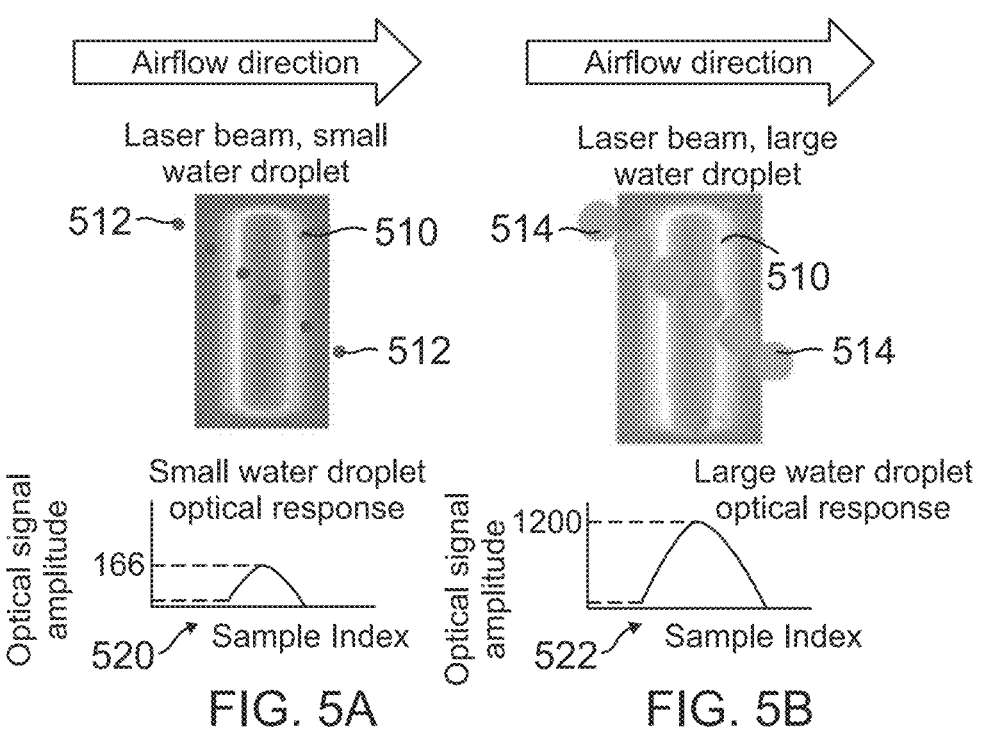
FIG. 5A
FIG. 5B
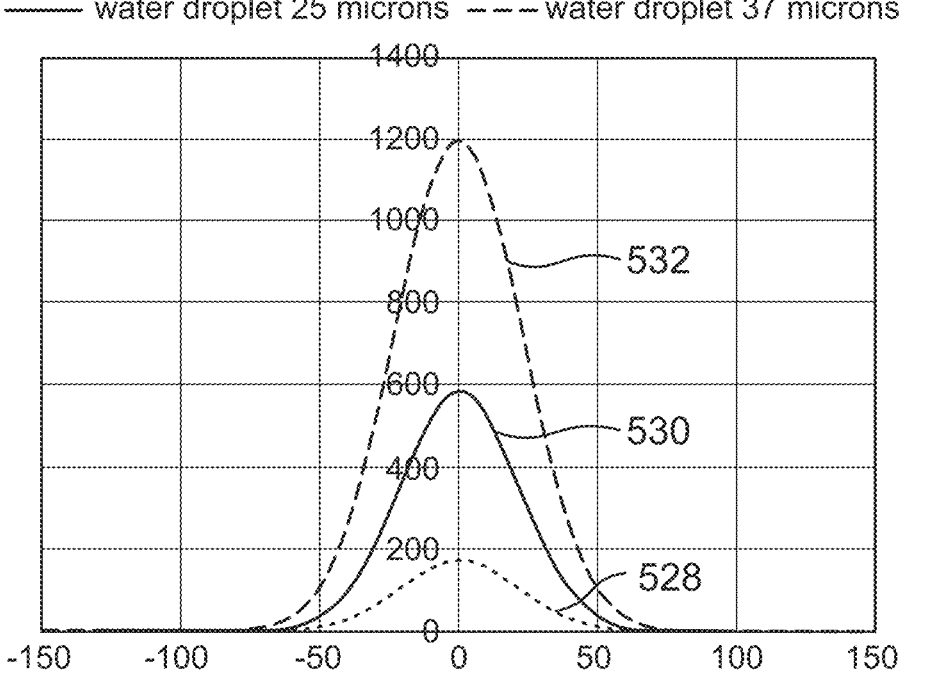
FIG. 5C

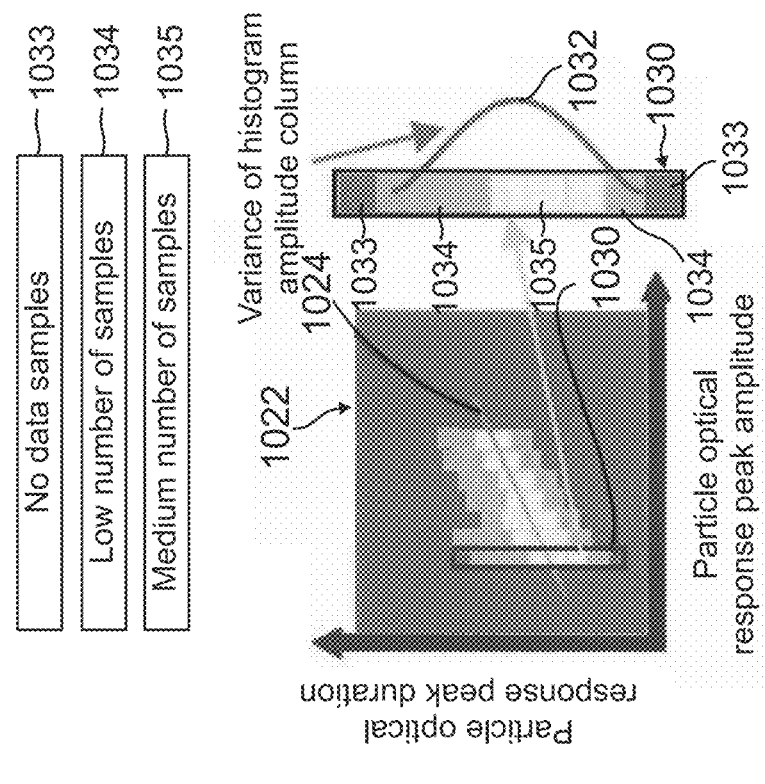
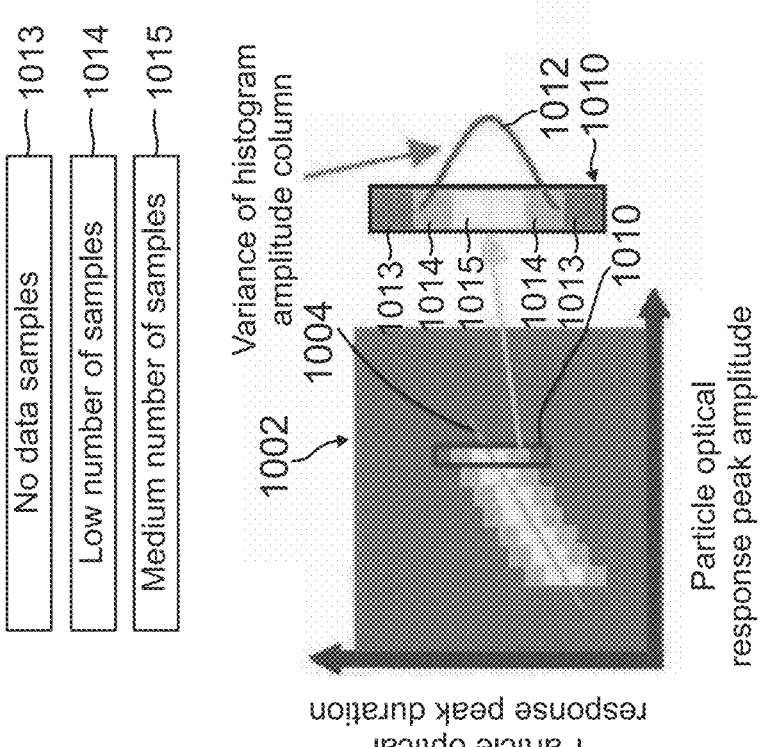
FIG. 10

OPTICAL SENSOR PARTICULATE CLASSIFICATION USING OPTICAL RESPONSE SIGNAL ANALYSIS

STATEMENT REGARDING GOVERNMENT SPONSORED RESEARCH OR DEVELOPMENT

The project leading to this application has received funding from the Clean Sky 2 Joint Undertaking under the European Union's Horizon 2020 research and innovation program under grant agreement No 945583.

BACKGROUND

High concentrations of ice crystals within atmosphere result into ice accretion within aircraft engines, resulting into reduced engine thrust, increased vibration, and other issues. In addition, volcanic ash is hard and abrasive, and high concentrations of volcanic ash within atmosphere cause significant wear to propellers and turbo-compressor blades, resulting into engine flameout, and other issues.

In conventional particle sensors, discrimination of water droplets and ice crystals can be based on light depolarization signal analysis since water droplets are spherical and ice crystals are aspherical. Spherical particles change light polarization differently from aspherical particles. In addition, the discrimination of water droplets and volcanic ash/sand/dust can be based on depolarization signal analysis since water droplets are spherical, and volcanic ash/sand/dust particles are aspherical. However, as ice crystals and volcanic ash/sand/dust particles are aspherical, these can be difficult to distinguish one from another using existing particle classification methods.

In conventional particle sensors, discrimination of spherical and aspherical particles can be based on light depolarization signal analysis, as described in the previous paragraph. To perform the depolarization signal analysis, the sensor optical system splits received light signal into S-polarized and P-polarized beams, and the optical response of each polarized beam is measured by a dedicated photodetector. A polarizing beamsplitter can be used to split the light signal into S-polarized and P-polarized beams. An avalanche photodiode can be used to measure polarized optical signals. However, depolarization signal analysis requires dedicated optical elements to be integrated into the sensor, which increases size, weight, and manufacturing costs of the sensor.

SUMMARY

A system comprises a particle sensor assembly for a vehicle, the particle sensor assembly comprising a light source configured to direct a light beam to an interrogation region outside of the vehicle, and an optical detector configured to receive scattered or reflected light from an aerosol particle in the interrogation region. A processor is in operative communication with the optical detector, and hosts a module that includes program instructions, executable by the processor, to perform a method for particle classification. The method comprises measuring an optical response from a single particle in the interrogation region by a process comprising: identifying an optical response peak for scattered or reflected light from the interrogation region; measuring an amplitude and duration of the optical response peak; and correcting the duration of the optical response peak based on an airspeed of the vehicle. Based on the measured amplitude of the optical response peak, the method further includes generating an expected optical response duration for a water droplet using a calibration table; analyzing the measured optical response duration and the expected optical response duration to determine a particle classification; and generating classification probabilities for one or more particle types.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 2 is a flow diagram of a method for particulate classification using optical response signal analysis, according to one implementation;

FIGS. 5A and 5B are images illustrating the optical responses for water droplets having different sizes;

FIG. 5C is a graph illustrating the optical responses for water droplets having different sizes;

FIG. 10 illustrates two-dimensional histograms showing optical response peak duration and optical response peak amplitude data distributions for ice crystals and volcanic ash/sand/dust particles.

DETAILED DESCRIPTION

Figure 1:
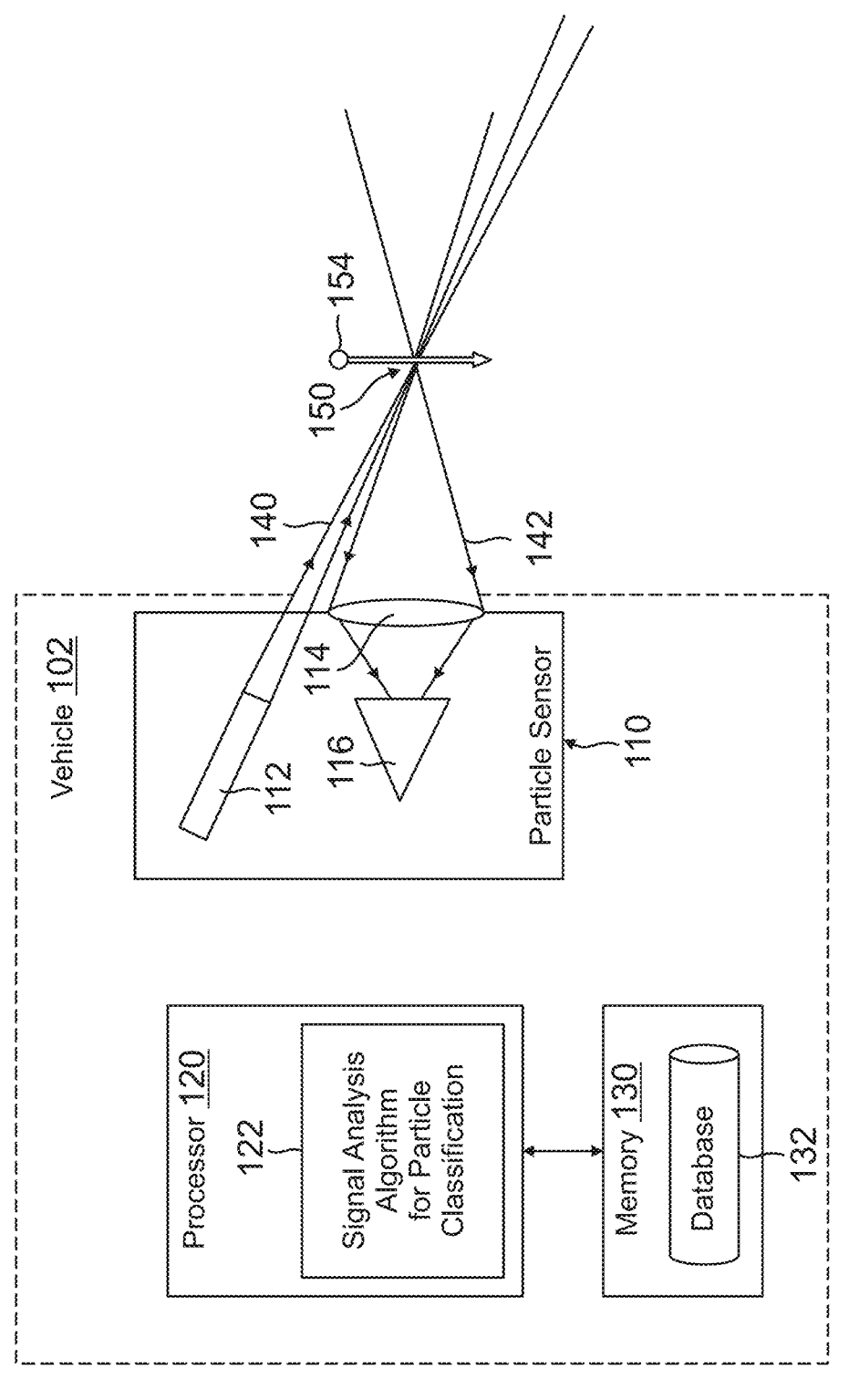
FIG. 1 is a block diagram of a system for particulate classification using optical response signal analysis, for use in a vehicle, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for optical sensor particulate classification using optical response signal analysis is described herein. The present approach provides methods for discrimination of various particle types, including water droplets, ice crystals, volcanic ash, sand, and dust particles.

In general, a water droplet, ice crystal, or volcanic ash/sand/dust particle flies through a laser beam profile emitted by an optical particulate sensor. The particle backscatters laser beam light, which is collected by an optical detector such as photodiodes, and an optical response is detected by the sensor.

Ice crystal particles and volcanic ash particles have a different refraction index and different surface optical properties. Ice crystals have a crystal lattice, have smooth surfaces, and can form many symmetric shapes. Ice crystal optical signal reflection on a small area of its surface can be approximated by simple reflection (direct reflection). Volcanic ash surfaces are porous, and the shape is asymmetric. Volcanic ash optical signal reflection on a small area of its surface can be approximated by diffused reflection. Therefore, the optical response of ice crystals and volcanic ash is different. Water droplets up to a diameter of about 1000-2000 microns can be considered spherical or almost spherical, have a smooth surface, and optical signal reflection on a small area of the surface can be approximated by simple reflection (direct reflection). The optical response of water droplets is mostly produced by external reflections and by internal reflections. Therefore, the optical response of water droplets is different from ice crystals and volcanic ash particles.

Particle optical response peak duration can be measured as number of optical signal digital samples above level of noise. The number of digital samples above the noise level is dependent on airspeed: the higher the airspeed, the lower the number of digital samples will be measured. Knowing the airspeed (provided by other vehicle systems to the particulate sensor), the particle optical response can be resampled (signal up sampling, signal down sampling, signal interpolation) and become independent of airspeed. Analyzing the optical response peak duration and optical response peak amplitude can be used to determine if the particle is a water droplet, ice crystal, or volcanic ash/sand/dust particle.

To make optical response independent of airspeed, a resampling method can be used. Suppose a sensor will support the following aircraft airspeed range: 50 to 300 meters per second (mps); and suppose a sensor digital sampling frequency is 50 MHz. For the 50 meters per second airspeed, particle position with respect to the vehicle will shift by 1 micron between two consequent digital samples (distance=50 mps*20 ns). For the 300 meters per second airspeed, particle position with respect to the vehicle position will shift by 6 microns between two consequent digital samples (distance=300 mps*20 ns). The sensor may use resampling methods (up sampling/down sampling/interpolation) to make particle optical response independent of airspeed. For example, if the 300 meters per second optical response is up sampled 6 times, it will provide an optical response with a number of digital samples equal to 50 meters per second optical response.

Alternatively, if the optical response peak shape does not need to be measured, peak duration can be made independent of airspeed by multiplying a measured optical response peak duration by the following correction factor:

$$\frac{\text{measured airspeed}}{\text{maximal airspeed}}.$$

The advantage of this solution is lower computation and memory demands.

The present methods can be integrated into prior sensor systems, such that a processor uses multiple dissimilar methods to identify types of particles. For example, the processor can be operative to perform depolarization signal analysis to identify types of particles and can also perform optical response signal analysis of peak amplitude, duration, and peak shape. The processor can use the results from these methods as inputs into various computer models, such as expert systems, probabilistic models, and machine learning. The processor can then estimate the types of particulate content. Adding dissimilar particle classification methods and merging these with existing methods can increase estimation accuracy for particle type identification.

In addition, the present methods can be integrated into prior sensor systems, in which a processor does not perform depolarization signal analysis to identify types of particles. For example, the processor can be operative to perform optical response signal analysis of peak amplitude, duration, and peak shape. The processor can use the results to distinguish spherical particles, such as water droplets from aspherical particles, such as ice crystals and volcanic ash/sand/dust particles. The processor can use the results for particle type identification, such as water droplets, ice crystals and volcanic ash/sand/dust particles.

Further details of various embodiments are described hereafter and with reference to the drawings.

FIG. 1 illustrates a system 100 for enhanced particulate classification, for use in a vehicle 102 such as an aircraft, according to one embodiment. The system 100 generally includes a particle sensor assembly 110 comprising at least one light source 112, such as a laser device, and a set of receive optics 114 configured to provide at least one receive channel. In one embodiment, light source 112 and receive optics 114 can be implemented in an optical transceiver, which is part of a light detection and ranging (LiDAR) device. The receive optics 114 couples received light to optical detector 116 in particle sensor assembly 110. The optical detector 116 can include one or more photodiodes such as avalanche photodiodes. The receive optics 114 may use a polarizing beamsplitter to split the light into reflected S-polarized light and transmitted P-polarized light beams.

The system 100 also includes at least one processor 120 in operative communication with optical detector 116, and at least one memory unit 130 in operative communication with processor 120. The processor 120 hosts a software module 122 operative to provide a signal analysis algorithm for particle classification. A database 132 is stored in memory unit 130.

The light source 112 is configured to transmit a light beam 140 into an external interrogation region 150 outside of vehicle 102. The receive optics 114 is configured to collect a scattered or reflected portion 142 of light beam 140 from at least one aerosol particle 154 in interrogation region 150. The receive optics 114 may be configured to propagate the collected light directly to optical detector 116 or may be configured to use a polarizing beamsplitter to split the light into reflected S-polarized light and transmitted P-polarized light beams and propagate the light beams to two separate optical detectors 116. The optical detector 116 is configured to receive the collected scattered or reflected portion 142 through the receive channel provided by receive optics 114. The optical detector 116 is operative to convert the light from scattered or reflected portion 142 to an electrical signal that is proportional to the intensity of the light. This allows optical detector 116 to measure an optical response as a function of time and optionally polarization to produce measurement data, which is sent to processor 120 for use in software module 122.

If receive optics 114 does not contain a polarizing beamsplitter, a single optical response peak is generated by optical detector 116. The particulate classification method using optical response signal analysis describes classification using a single response peak. However, if receive optics 114 contains a polarizing beamsplitter, two optical response peaks are generated by optical detector 116. These peaks are processed individually using the same method as a single optical response peak. If processor 120 does not have sufficient computing power, an add operation can be used to merge the two peaks into a single peak prior to the data processing. As there is no significant difference between single and two peaks processing, the single peak processing method will be described in the following text.

The software module 122 includes program instructions, executable by processor 120, to perform a method for particle classification for interrogation region 150 based on the measured data from optical detector 116. The method can determine particle classification by statistical analysis of optical response peak duration and optical response peak amplitude data. The particle classification can include classification of water droplets, ice crystals, volcanic ash/sand/ dust, or the like. The method allows for the discrimination of spherical particles, such as water droplets, from aspherical particles such as ice crystals, volcanic ash, sand, and dust. The particle classification data can then be output from processor 120 to other vehicle systems, such as a vehicle computer for use in further vehicle data processing.

FIG. 2 is a flow diagram of a method 200 for particulate classification using optical response signal analysis, according to one implementation. The method 200 can be implemented, for example, by software module 122 (FIG. 1) in providing a signal analysis algorithm for particle classification.

The method 200 comprises transmitting a light beam from a light source on a vehicle, to an interrogation region outside of the vehicle (block 210); and receiving, in an optical detector on the vehicle, scattered or reflected light from an aerosol particle in the interrogation region (block 212). The method 200 includes measuring an optical response from the aerosol particle in the interrogation region by identifying an optical response peak of the scattered or reflected light from the interrogation region, and resampling the optical response to make it independent of vehicle airspeed (block 214). The method 200 then proceeds with quantification of the optical response parameters by identifying the amplitude, duration and shape of the resampled optical response peak (block 216).

The method 200 then performs the step of generating an expected water droplet optical response using a calibration table, based on the measured value of peak amplitude, including the duration and shape of the expected optical response peak shape and expected optical response peak duration (block 218). The method 200 follows with analyzing the measured optical response and the expected optical response to determine whether the particle is a spherical particle (water droplet) or aspherical particle (ice crystal, volcanic ash/sand/dust particle) (block 220). The method 200 then proceeds with generating probability values for detection of spherical/aspherical particle, and providing the most probable particle type and the particle type classification probability to the processor (block 222).

In one implementation, the particle classification can be determined by a process comprising calculating a difference value between the measured duration of the optical response peak and the expected optical response peak duration; and comparing the difference value to a predefined difference threshold to determine the particle classification.

In another implementation, the particle classification can utilize a process comprising calculating a difference between a measured optical response peak shape and an expected optical response peak shape. For example, the following items could be analyzed: peak symmetry, peak slope rate, full width at half maximum, etc.

Figure 3:
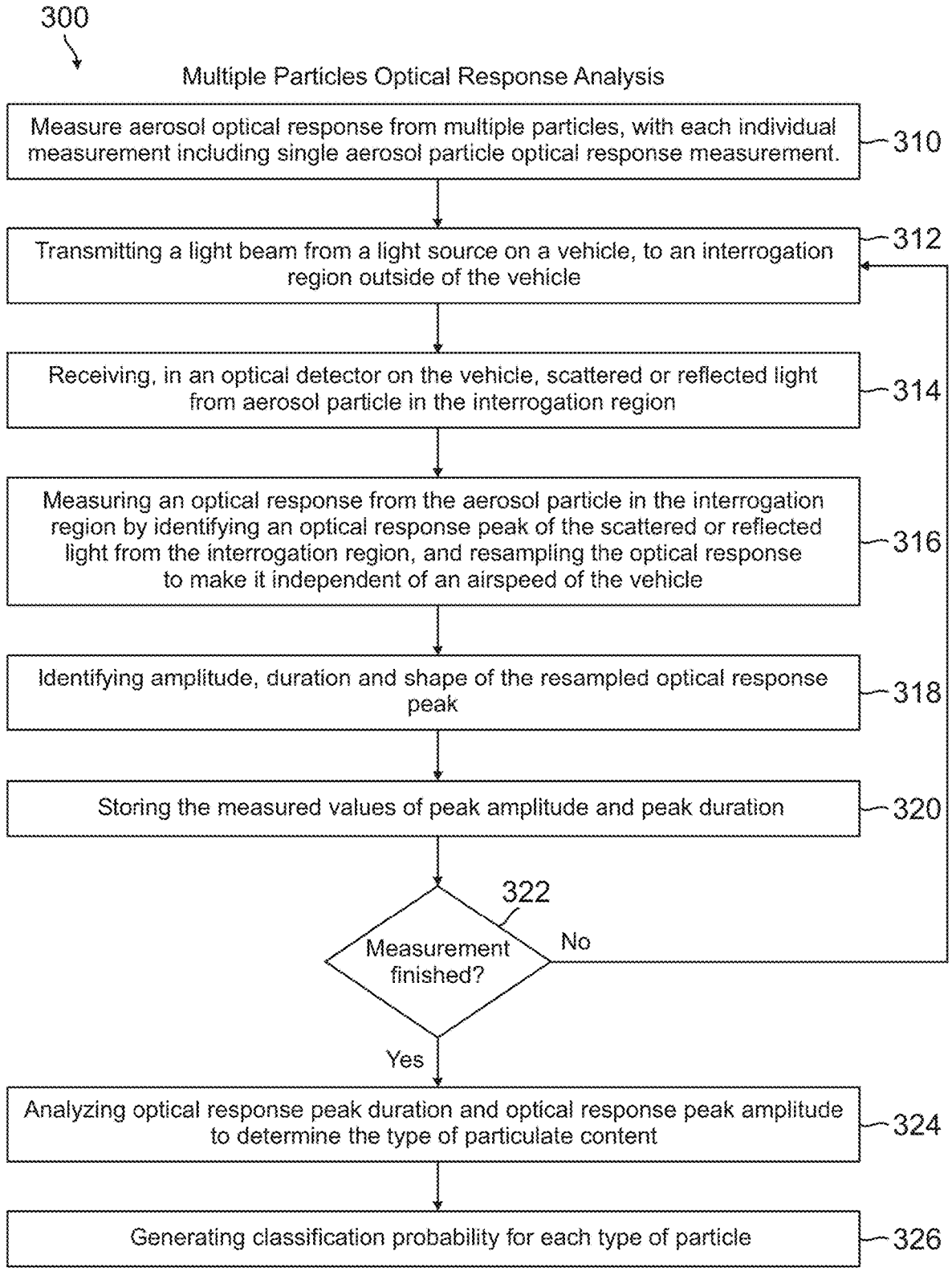
FIG. 3 is a flow diagram of a method for particulate classification using optical response signal analysis, according to another implementation.

FIG. 3 is a flow diagram of a method 300 for particulate classification using optical response signal analysis for multiple aerosol particles, according to another implementation. The method 300 can be implemented, for example, by software module 122 (FIG. 1) in providing a signal analysis algorithm for particle classification. The method 300 measures an aerosol optical response from multiple particles, with each individual measurement including a single aerosol particle optical response measurement (block 310).

The method 300 comprises transmitting a light beam from a light source on a vehicle, to an interrogation region outside of the vehicle (block 312); and receiving, in an optical detector on the vehicle, scattered or reflected light from an aerosol particle in the interrogation region (block 314). The method 300 includes measuring an optical response from the aerosol particle in the interrogation region by identifying an optical response peak of the scattered or reflected light from the interrogation region, and resampling the optical response to make it independent of vehicle airspeed (block 316).

The method 300 then proceeds with quantification of the optical response parameters by identifying the amplitude, duration and shape of the resampled optical response peak (block 318); and storing the measured values of peak amplitude and peak duration, such as in a processor memory (block 320). The method 300 then determines whether measurement from multiple particles is finished (block 322); if not, method 300 returns to block 312 and repeats the foregoing steps. Once measurement from multiple particles is finished (block 322), method 300 performs analyses of the optical response peak duration and optical response peak amplitude to determine the type of particulate content (block 324), and generates a classification probability for each type of particle (block 326).

In one implementation, analyses of the optical response peak duration and optical response peak amplitude (block 324) is performed by generating a two-dimensional histogram, where a first axis corresponds to the measured optical response amplitude and a second axis corresponds to the measured optical response duration. The particle type classification can be determined by a process comprising calculating a variance of the optical response duration for each column of optical response amplitude; and comparing the calculated variance with predefined variance thresholds for each type of particle.

Further details regarding the particle classification methods are described hereafter.

Aerosol Optical Response

In water droplets, the main source of reflected or scattered light is an internal reflection within the water droplets (e.g., rainbow image). A water droplet particle generally has a spherical shape. For example, water droplets with a diameter less than about 1000 microns can have a spherical shape, and water droplets of a diameter between about 1000 to 2000 microns have an almost spherical shape. The optical response of these water droplet particles is deterministic. Water droplets with larger diameters are pulled down by gravity and due to air resistance, the water droplet shape is flattened. In water droplet reflection, a direct reflection model is expected. The scattered light amplitude is dependent on droplet diameter (size).

In ice crystals, the main source of reflected or scattered light are external reflections and internal reflections. An ice crystal particle has a non-spherical or asymmetrical shape. Ice crystals have a shape that is dependent on nucleation (homogeneous or heterogeneous). For homogeneous nucleation, air temperatures are less than about −38° C. For heterogeneous nucleation, air temperatures are greater than about −38° C., and condensation nucleating particles are needed. After nucleation, ice crystals grow by vapor deposition. The basic shape of pristine ice crystals is mostly hexagonal. There may be different shapes of ice particles, however, those are expected to be a minority. The scattered light amplitude is dependent on ice crystal size (equivalent diameter), shape, and orientation with respect to the sensor.

Volcanic ash, sand, and dust particles have diffuse reflections and internal reflections. Such particles have a non-spherical or asymmetrical shape. For smaller particles, the main source of reflected or scattered light is external diffuse reflections and internal reflections. Optical signal attenuation within smaller particles exists, however, its effect is not dominant as the distance the optical signal travels is significantly shorter compared to the depth of penetration. For larger particles, the main source of reflected or scattered light is external diffuse reflections. Optical signal attenuation within larger particles is dominant as the distance the optical signal travels is comparable or larger than the depth of penetration.

Volcanic ash, sand, and dust particles have various compositions and porous structures. The scattered light amplitude is dependent on particle size (equivalent diameter), shape, particle roughness (microscopic irregularities of the particle surface), particle composition, and orientation with respect to a sensor. The optical response of volcanic ash, sand, and dust is different from water droplets and ice crystals due to two facts. First, the porous structure of ash/sand/dust causes the light to have diffused reflection (internal and external); for example, as a volcanic ash particle surface is porous, it causes diffused light reflection. Second, the particle material of the ash/sand/dust causes optical attenuation inside of the particle; as the particle gets larger, multiple internal reflections are not a significant source of scattered or reflected light as the light is absorbed by the particle material.

The optical response of water droplets, ice crystals, and volcanic ash/sand/dust particles can be approximated by geometrical optics, as the laser wavelength is significantly shorter than most of the measured particle diameters. This is the reason why Mie scattering is not mentioned in the paragraphs above.

In addition, with respect to the optical response of aerosol particles, it is expected that due to differences in aerosol optical properties, particles of the same volume from different materials will provide different optical responses.

Refractive Index of Aerosol Particles

The real component of refractive index defines how light is slowed down in a selected material. The imaginary component of refractive index defines how light is attenuated in the selected material. The refractive index is similar for water droplets and ice crystals. The refractive index of volcanic ash, sand, and dust particles differs significantly from that of water droplets and ice crystals.

With respect to the refractive index of water droplets and ice crystals, the real component of refractive index is stable in the visible and near infrared region (about 600-1000 nm).

The imaginary component of refractive index changes in the visible and near infrared region, however, this does not result in significant changes in optical response of the water droplets and ice crystals. With respect to the refractive index of volcanic ash particles, the refractive index is stable in the visible and near infrared region (about 380-2500 nm).

There is negligible optical signal attenuation within water droplets and ice crystals, but significant optical signal attenuation within volcanic ash, sand, and dust particles.

Particle Classification Using Optical Response Signal Analysis

Figures 4A, 4B, 4C:
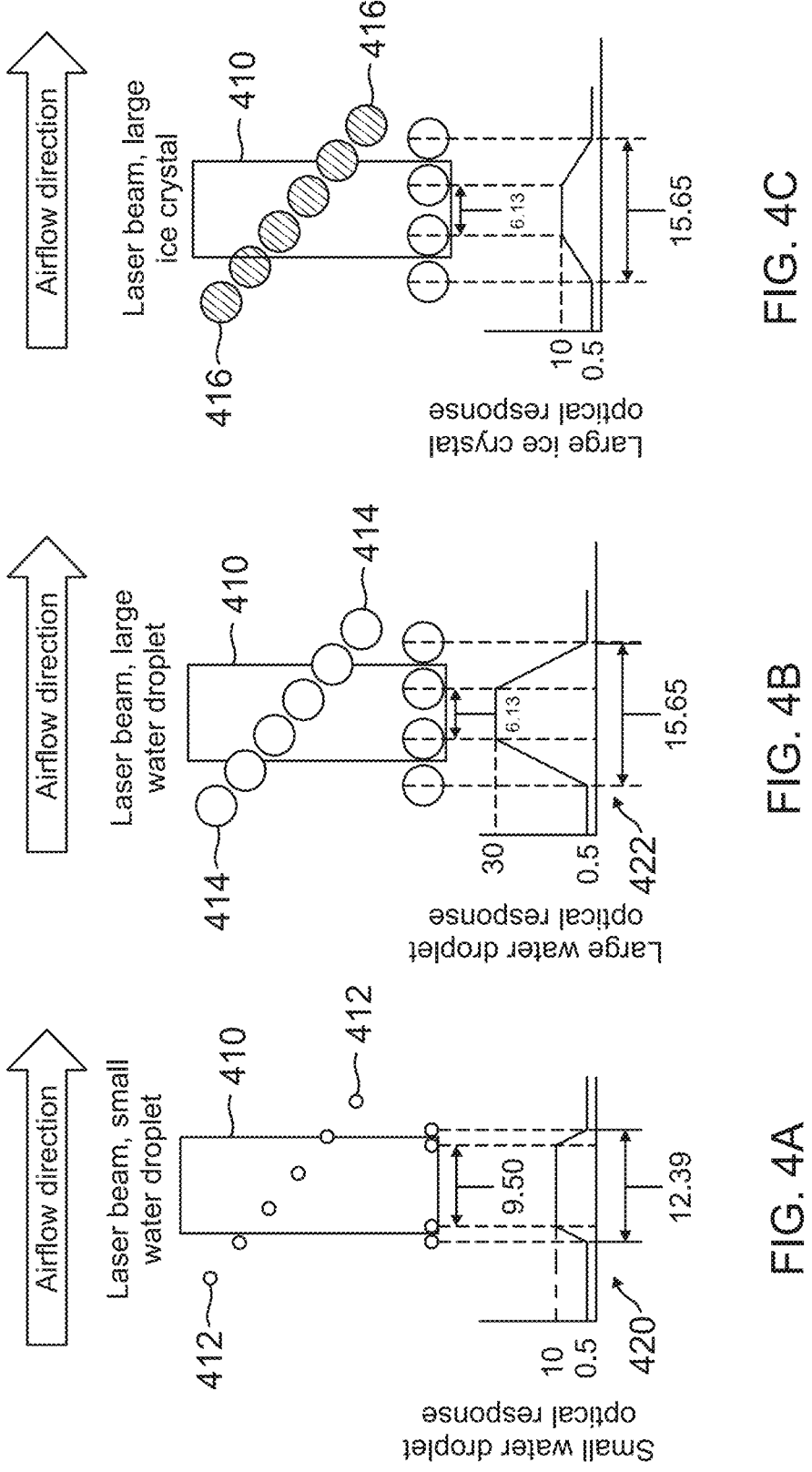
FIGS. 4A-4C are example schematic representations of particle classification using an optical response signal analysis method.

FIGS. 4A-4C are example schematic representations of a particle classification method using optical response signal analysis. A laser beam 410, with an idealized beam profile, has 100% energy within the beam profile and 0% energy out of the beam profile. An aerosol particle produces an optical response once any part of the particle is within the beam profile as it moves along an airflow direction. The particle produces zero optical response if it is out of the beam profile, and produces a maximal optical response if it is fully within the beam profile.

In the example shown in FIG. 4A, a small water droplet 412 passing through laser beam 410 may produce a peak total duration of 12.39; a peak edge duration of 0.5*(12.39−9.5)=1.445; and a peak amplitude of 10, as depicted in plot 420. In the example shown in FIG. 4B, a large water droplet 414 passing through laser beam 410 may produce a peak total duration of 15.65; a peak edge duration of 0.5*(15.65−6.13)=4.76; and a peak amplitude of 30, as depicted in plot 422. In the example shown in FIG. 4C, a large ice crystal 416 (which reflects/scatters light less efficiently to sensor optics than a larger water droplet) passing through laser beam 410 may produce a peak total duration of 15.65; a peak edge duration of 0.5*(15.65−6.13)=4.76; and a peak amplitude of 10.

Accordingly, the measurement of the optical signal peak duration and optical signal peak amplitude can be used to identify the type of material passing through laser beam 410. For example, the water droplet has a unique dependency of amplitude and peak duration, while the ice crystal has a unique dependency of amplitude and peak duration.

The following examples illustrate particle classification using optical response signal analysis that utilizes a laser beam having a Gaussian beam profile. A particle passing through the Gaussian beam profile will provide an optical response dependent on particle reflectivity within a current energy density of the Gaussian beam profile.

FIGS. 5A and 5B are example schematic representations of water droplet optical response, which illustrate that water droplets of various diameters produce different optical responses. A laser beam 510 has a Gaussian beam profile. An aerosol particle passing through the Gaussian beam profile along an airflow direction will provide an optical response dependent on particle reflectivity within a current energy density of the Gaussian beam profile. In this example, the laser beam Gaussian $1/e^2$ width is 80 microns.

In the example shown in FIG. 5A, a small water droplet 512, having a size of 13 microns, passes through laser beam 510 and has a peak amplitude of 166, as depicted in plot 520. In the example shown in FIG. 5B, a large water droplet 514, having a size of 37 microns, passes through laser beam 510 and has a peak amplitude of 1200, as depicted in plot 522.

FIG. 5C is a graph illustrating the optical response for water droplets having a size of 13 microns, 25 microns and 37 microns. As shown, an optical response curve 528 for the water droplets having a size of 13 microns have a lower peak amplitude and shorter peak duration than an optical response curve 530 for water droplets having a size of 25 microns. Water droplets having a size of 25 microns have a lower peak amplitude and shorter peak duration than an optical response curve 532 for water droplets having a size of 37 microns. As water droplets shape up to a diameter of about 1000 to 2000 microns is spherical or almost spherical, its optical response is independent of particle orientation with respect to a sensor. In the ideal case, the dependency of optical response peak duration on optical response peak amplitude is a one-to-one function, where the larger the peak amplitude is, the longer the peak duration is.

Figures 6A, 6B:
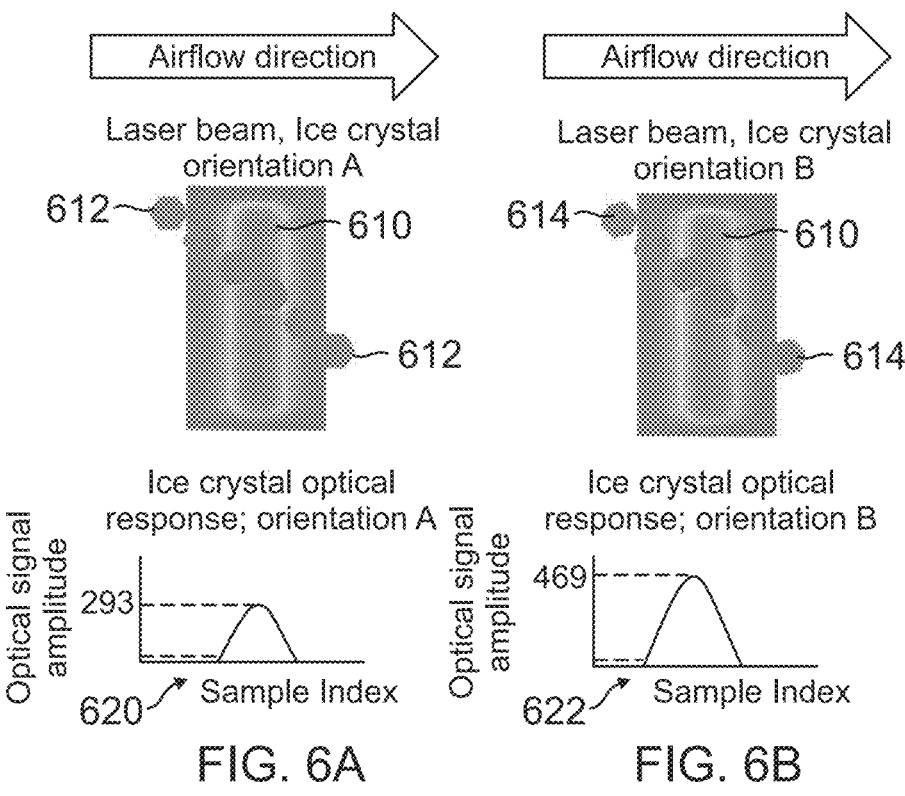
FIGS. 6A and 6B are images illustrating the optical responses for a single ice crystal having different orientations with respect to a sensor, therefore having a different optical response.

FIGS. 6A and 6B are example schematic representations of ice crystal optical response, which illustrate that ice crystal optical response may be different than water droplet optical response. A laser beam 610 has a Gaussian beam profile. In this example, the laser beam Gaussian $1/e^2$ width is 80 microns.

In the example shown in FIG. 6A, an ice crystal 612 (with an orientation A) having a size of 25 microns, passes through laser beam 610 and has a peak amplitude of 293, as depicted in plot 620. In the example shown in FIG. 6B, an ice crystal 614 of the same shape and size as ice crystal 612, only with a different orientation (orientation B) with respect to s sensor, passes through laser beam 610 and has a peak amplitude of 469, as depicted in plot 622.

Figure 6C:
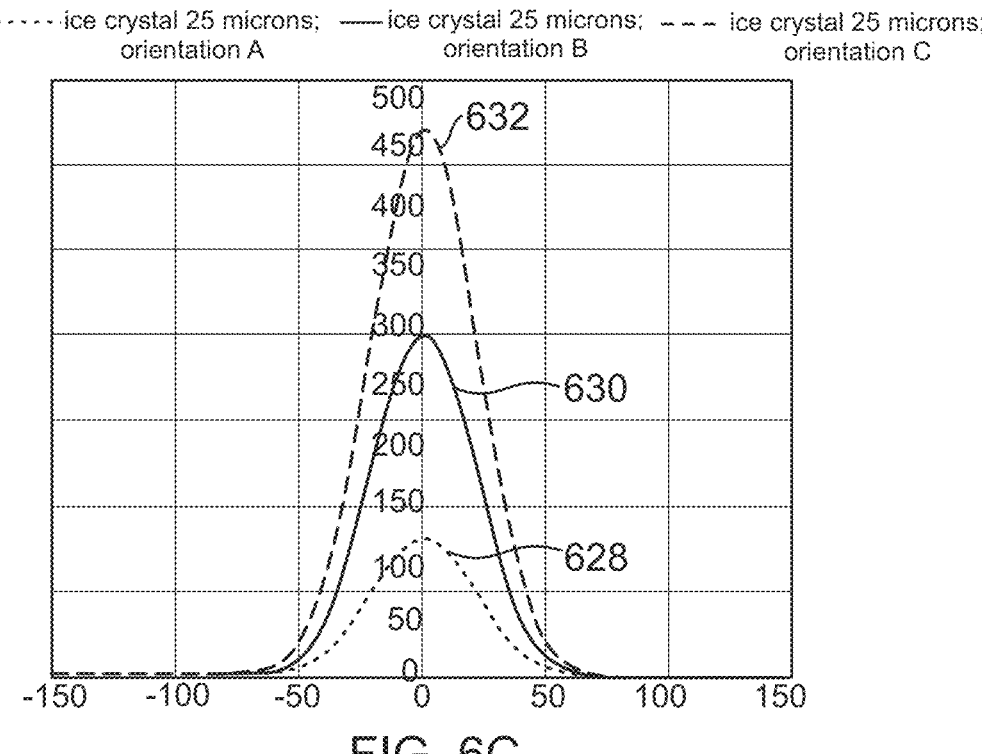
FIG. 6C is a graph illustrating the optical responses for a single ice crystal having different orientations with respect to a sensor, therefore having a different optical response.

FIG. 6C is a graph illustrating the optical responses for ice crystals having a size of 25 microns, all having the same size and shape, but with different orientations with respect to the sensor. As shown, an optical response curve 628 for an ice crystal of orientation A has a lower peak amplitude and shorter peak duration than an optical response curve 630 for an ice crystal of orientation B. The ice crystal of orientation B has a lower peak amplitude and shorter peak duration than an optical response curve 632 for an ice crystal of orientation C.

Ice crystals of a single size can produce optical responses with a different peak amplitude and different peak duration. This is different from water droplets, where each size of water droplet produces unique values of peak amplitude and peak duration.

Figure 7:
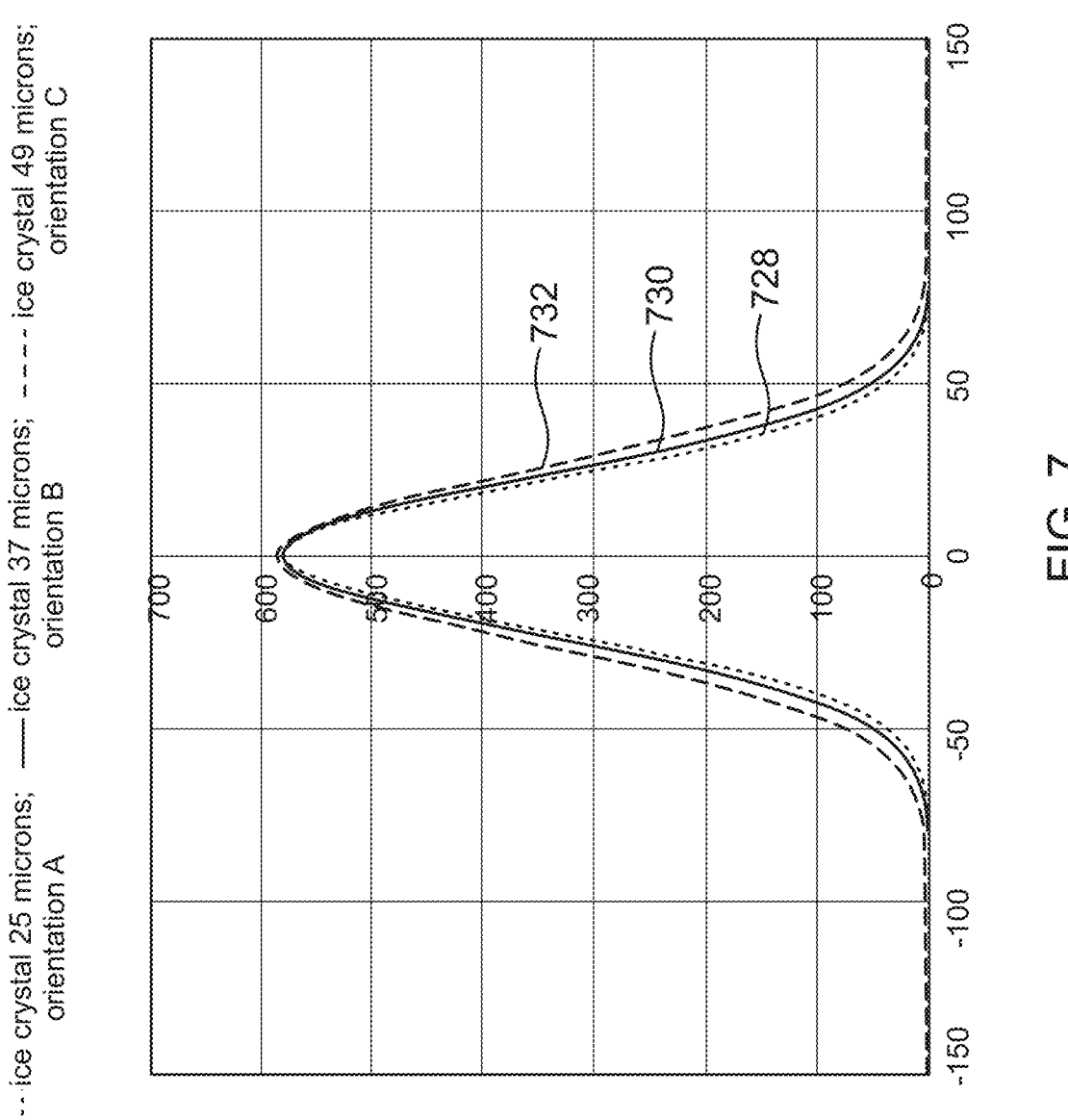
FIG. 7 is a graph illustrating the optical response for ice crystals with the same shape, but with different sizes and different orientations with respect to a sensor, in which the ice crystals generate an optical response with the same amplitude.

FIG. 7 is a graph illustrating the optical response of ice crystals having a size of 25 microns (curve 728), 37 microns (curve 730), and 49 microns (curve 732), all having the same shape, but with different orientations with respect to a sensor. The ice crystal of size 25 microns has an orientation A that allows efficient reflection/scattering of the optical signal to the sensor; the ice crystal of size 37 microns has an orientation B that allows less efficient reflection/scattering of the optical signal to the sensor; and the ice crystal of size 49 microns has an orientation C that allows the least efficient reflection/scattering of the optical signal to the sensor. The ice crystals produce the same optical response peak amplitude; however, each ice crystal produces a unique value of optical response peak duration.

Water droplet shape up to a diameter of about 1000 to 2000 microns is spherical or almost spherical, and its optical response is independent of particle orientation with respect to the sensor. For water droplets, if dependency of the optical response duration on optical response peak amplitude is plotted, the result will be a unique curve, where each optical response peak amplitude value has its unique optical response peak duration value. The larger the water droplet, the larger the optical response amplitude is and the longer the optical response peak duration is. Due to noise in the system, a histogram can be used, such as visualized in FIG. 8.

Figure 8:
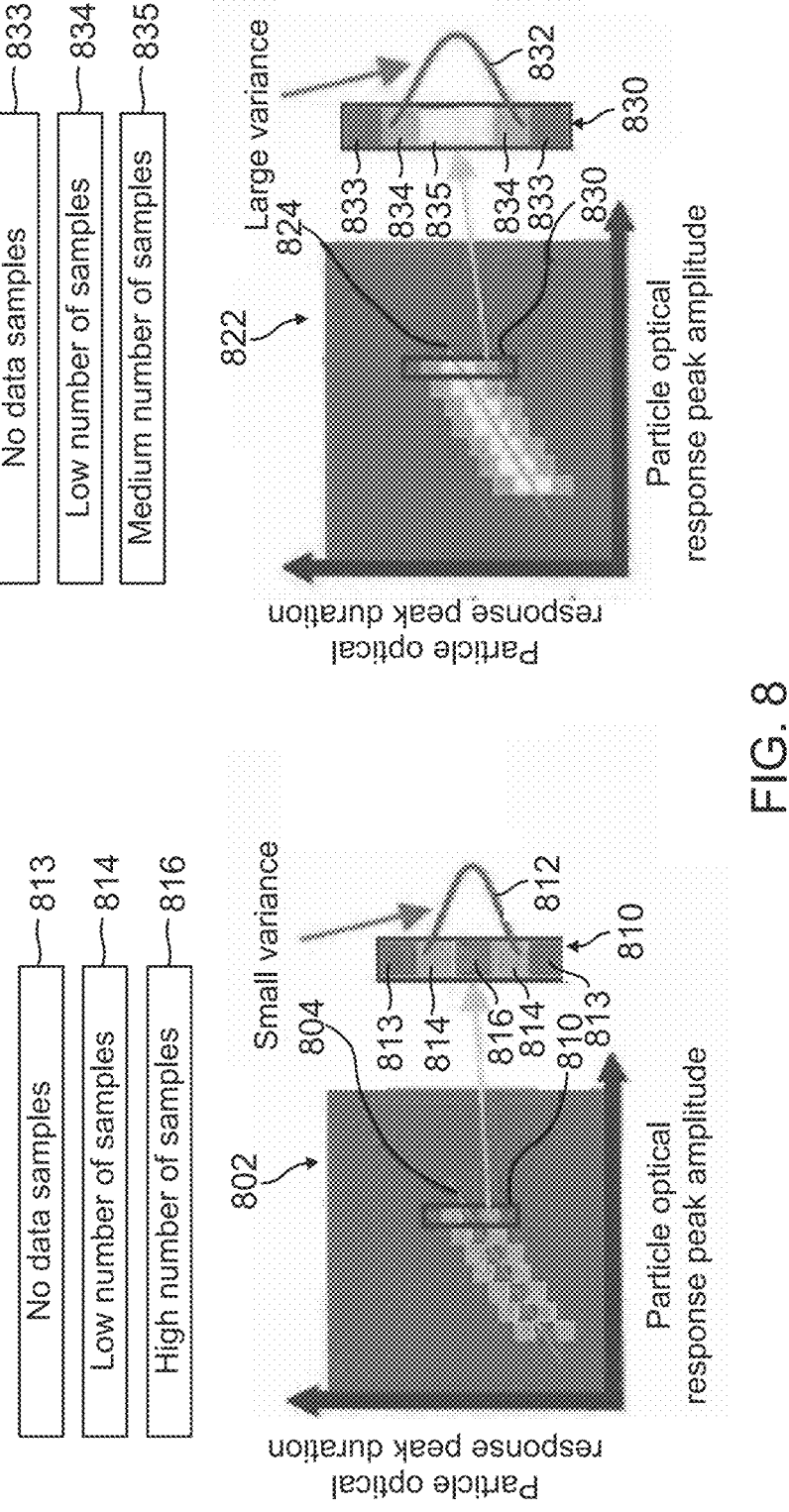
FIG. 8 illustrates two-dimensional histograms showing optical response peak duration and optical response peak amplitude data distributions for water droplets and ice crystals.

FIG. 8 illustrates two-dimensional histograms showing optical response peak duration and optical response peak amplitude data distribution for water droplets and ice crystals. In a histogram 802 for the water droplets, the data distribution follow a curve 804 and data are distributed closely to curve 804. If a single column 810 of optical response amplitude (from curve 804) is analyzed, the optical response peak duration data will have a small variance 812. The sections of column 810 include no data samples (813), a low number of samples (814), and a high number of samples (816).

Ice crystal shape is aspherical and its orientation with respect to the sensor is random. Suppose there are two particles of the same shape and different size. The small particle is oriented in a way that it reflects/scatters light efficiently into the sensor, and the large particle is oriented in a way that it reflects/scatters light less efficiently into the sensor. It may happen that due to different reflect/scatter efficiency, both particles produce the same optical response amplitude, however, due to different sizes of the particles, the optical response duration is different. Therefore, ice crystals may have multiple values of optical response peak duration for a single value of optical response peak amplitude. The generic trend is that the larger the ice crystal is, the larger the optical response amplitude is and the longer the optical response peak duration is.

Referring again to FIG. 8, in a histogram 822 for the ice crystals, the data distribution follow a unique curve 824, however, the data is distributed less closely to curve 824. If a single column 830 of optical response amplitude (from curve 824) is analyzed, the optical response peak duration data will have a large variance 832. The sections of column 830 include no data samples (833), a low number of samples (834), and a medium number of samples (835).

The peak amplitude and peak duration comparison can be done using multiple methods. Examples of particle classification using optical response signal analysis methods are described hereafter.

Water Droplets Discrimination from Aspherical Particles: Particle-by-Particle Method With respect to water droplet optical response, for a single water droplet volume, its shape is spherical and therefore its optical response is independent of its orientation with respect to the sensor. With respect to aspherical particle (e.g., ice crystal, sand, dust, volcanic ash) optical response, for a single aspherical particle volume, its composition, shape and surface optical properties can vary significantly, causing the optical response to be different (e.g., due to random orientation of the particle with respect to the sensor).

In the following example illustrating water droplet differentiation from aspherical particles, assume there is a water droplet and ice crystal of the same volume. The ice crystal particle shape could be, for example, a hexagonal plate or column. If the particle is oriented such that it reflects/scatters laser beam light efficiently to the sensor receiving optics, the particle may produce a higher optical response compared to a water droplet of the same volume. If the particle is oriented such that it reflects/scatters laser beam light mostly to other directions than to the sensor receiving optics, the particle may produce a lower optical response compared to a water droplet of the same volume. The water droplet would provide a single value of optical power on a photodetector of the sensor. The ice crystal would provide multiple values of optical power as its response is dependent on its shape and orientation with respect to the sensor.

The following method can be used to provide water droplet differentiation from aspherical particles. The advantage of the particle-by-particle classification method described below is its simplicity and low computational complexity. A sensor measures optical response from aerosol particles. A peak optical amplitude of scattered/reflected light is identified. The peak duration and peak shape is measured. The peak optical response is resampled based on current vehicle airspeed (e.g., airspeed value provided by aircraft systems through an avionics bus). After the resampling, the particle optical response becomes independent of airspeed. A processor accesses look-up calibration tables, where particle size dependency on optical amplitude is defined for all supported types of aerosol particles. The processor uses the look-up calibration tables and the measured value of optical signal amplitude to generate an expected optical response for a water droplet, including a single peak profile. The expected optical response measurement probability for the water droplet is 1-sigma, 2-sigma, 3-signa, X-sigma. If measured an aerosol particle is a water droplet, its optical response profile will be close to the expected optical response curve and within the X-sigma probability area. The further a particle measurement is from the X-sigma probability area, the less probable the particle is a water droplet.

Figure 9:
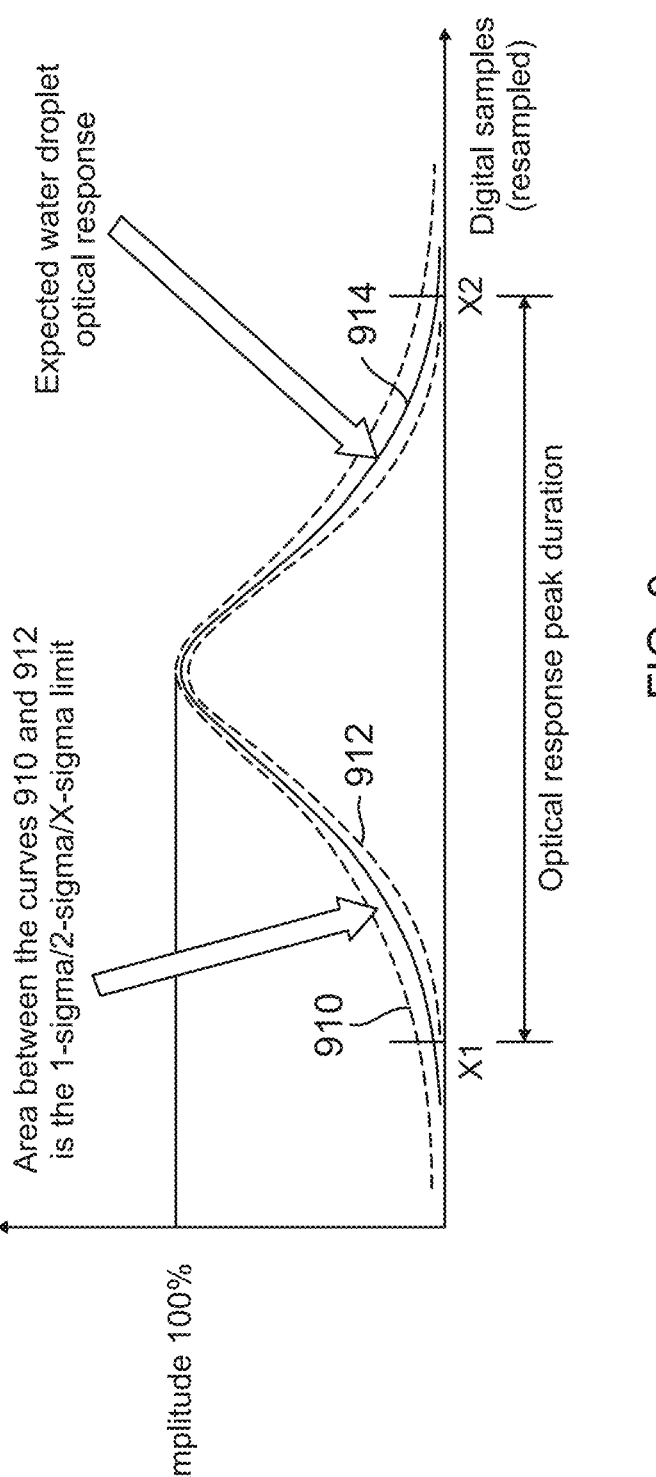
FIG. 9 is a graph illustrating expected water droplet optical response, and X-sigma probability curves.

FIG. 9 is a graph illustrating optical response peak duration and amplitude with respect to particle digital samples, where the optical response is resampled based on a value of vehicle airspeed. The area between curves 910 and 912 is the 1-sigma/2-sigma/X-sigma limit. A curve 914 is the expected water droplet optical response.

A processor analyzes the similarity of measured optical response and expected optical response for water droplets. If the measured optical response duration and peak shape is substantially matched with the expected optical response for water droplets, the detected particle is likely to be a water droplet. If the measured optical response duration and peak shape is not substantially matched with the expected optical response for water droplets, the detected particle is likely to be an aspherical particle, such as ice crystal, volcanic ash, sand, dust, or other type of particles. While single particles could be analyzed at a time, it is expected that multiple particles will be analyzed at a time to get a statistically significant result. A defined algorithm (e.g., threshold comparison, expert system, machine learning algorithm, probabilistic methods, etc.) can be used to identify the type of detected particles, such as water droplets or aspherical particles.

An example of water droplet detection follows. Assume aerosol particle is detected, with a measured amplitude of 1076, and a resampled peak width of 97 samples. Based on amplitude of the aerosol particle optical response, a processor uses a look-up table to identify an expected peak duration to be 95 samples. The processor calculates a difference (DIFF) between the measured and expected peak duration as follows:

$$DIFF = 100 * \left| \frac{X_{MEAS} - X_{EXPECTED}}{X_{EXPECTED}} \right| = 100 * \left| \frac{97 - 95}{95} \right| = 2.11\%$$

The difference is then evaluated by the processor. The difference is directly compared with a predefined difference threshold and can be provided to an expert system. Based on evaluation criteria, the processor identifies if the detected aerosol particles are water droplets or aspherical particles such as ice crystals, volcanic ash, sand, dust, other aspherical aerosol particles. For example, in the direct comparison with the predefined difference threshold, if the difference threshold is defined to be 5%, the aerosol particle is below the difference threshold and therefore is considered to be a water droplet.

An example of aspherical particle detection follows. Assume aerosol particle is detected, with a measured amplitude of 239, and resampled peak width of 99 samples. Based on amplitude of the aerosol particle optical response, a processor uses a look-up table to identify an expected peak duration to be 89 samples. The processor calculates a difference between the measured and expected peak duration as follows:

$$DIFF = 100 * \left| \frac{X_{MEAS} - X_{EXPECTED}}{X_{EXPECTED}} \right| = 100 * \left| \frac{99 - 89}{89} \right| = 11.24\%$$

The difference is then evaluated by the processor. The difference is directly compared with a predefined difference threshold and can be provided to an expert system. Based on evaluation criteria, the processor identifies if the detected aerosol particles are water droplets or aspherical particles. For example, in the direct comparison with the predefined difference threshold, if the difference threshold is again defined to be 5%, the aerosol particle is above the difference threshold and therefore is considered to be an aspherical particle.

Particle Type Classification Method: Data Analysis from Multiple Aerosol Particles The following method can be used to identify one of the following types of particles: 1) water droplets, 2) ice crystals, and 3) volcanic ash/sand/dust particles. As described in method 300 above, a sensor measures optical response from multiple aerosol particles and stores information related to measured peak shape, such as peak amplitude, peak duration, etc. (see FIG. 3, blocks 310 to block 322).

The processor will generate two-dimensional histograms, where a first axis describes optical response peak amplitude, and a second axis describes optical response peak duration. The measured data distribution will differ for each particle type due to different optical properties of each particle type. A defined algorithm (e.g., threshold comparison, expert system, machine learning algorithm, probabilistic methods, etc.) can be used to identify the type of detected particles, whether water droplets, ice crystals or volcanic ash/sand/dust.

Ice crystal optical response is expected to be different from volcanic ash, sand, or dust particles due to different refractivity index and surface optical properties. A difference in the real value of refractivity index results in different reflectivity of the particle. A difference in the imaginary value of refractivity index results in optical signal attenuation in volcanic ash, sand, or dust particles for particles in which penetration depth is similar or smaller than particle diameter. This will limit the optical response caused by internal reflections within the particle. A difference in surface optical properties results in different light propagation; ice crystals reflection can be described by direct reflection, while volcanic ash reflection can be described by diffused reflection.

An illustration of the different histogram data sample distribution is shown in FIG. 10, which illustrates two-dimensional histograms showing that optical response peak duration and optical response peak amplitude data distributions differ for ice crystals and volcanic ash/sand/dust particles. In a histogram 1002 for the ice crystals, the data distribution follow a curve 1004. If a single column 1010 of optical response amplitude (from curve 1004) is analyzed, the optical response peak duration data has a variance 1012. The sections of column 1010 include no data samples (1013), a low number of samples (1014), and a medium number of samples (1015).

In a histogram 1022 for the volcanic ash/sand/dust particles, the data distribution follow a curve 1024. If a single column 1030 of optical response amplitude (from curve 1024) is analyzed, the optical response peak duration data has a larger variance 1032. The sections of column 1030 include no data samples (1033), a low number of samples (1034), and a medium number of samples (1035).

The processing units and/or other computational devices used in the system and method described herein may be implemented using software, firmware, hardware, or appropriate combinations thereof. The processing units and/or other computational devices may be supplemented by, or incorporated in, specially-designed application-specific integrated circuits (ASICs) or field programmable gate arrays (FPGAs). In some implementations, the processing units and/or other computational devices may communicate through a transceiver with other computing devices outside of the navigation system, such as those associated with a management system or computing devices associated with other subsystems controlled by the management system. The processing units and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer or processor readable media used for storage of computer readable instructions or data structures. Such a computer readable medium may be available media that can be accessed by a general purpose or special purpose computer or processor, or any programmable logic device.

Suitable computer or processor readable storage media may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system comprising: a particle sensor assembly for a vehicle, the particle sensor assembly comprising: a light source configured to direct a light beam to an interrogation region outside of the vehicle; and an optical detector configured to receive scattered or reflected light from an aerosol particle in the interrogation region; and a processor in operative communication with the optical detector; wherein the processor hosts a module that includes program instructions, executable by the processor, to perform a method for particle classification comprising: measuring an optical response from a single particle in the interrogation region by a process comprising: identifying an optical response peak for scattered or reflected light from the interrogation region; measuring an amplitude and duration of the optical response peak; and correcting the duration of the optical response peak based on an airspeed of the vehicle; based on the measured amplitude of the optical response peak, generating an expected optical response duration for a water droplet using a calibration table; analyzing the measured optical response duration and the expected optical response duration to determine a particle classification; and generating classification probabilities for one or more particle types.

Example 2 includes the system of Example 1, wherein the particle classification comprises water droplets, ice crystals, volcanic ash, sand, or dust.

Example 3 includes the system of any of Examples 1-2, wherein the particle classification of the single particle is determined by a process comprising: calculating a difference value between the measured duration of the optical response peak and an expected optical response peak duration; and comparing the difference value to a predefined difference threshold to determine the particle classification.

Example 4 includes the system of Example 3, wherein: if the difference value is less than the predefined difference threshold, then the single particle comprises a water droplet; if the difference value is greater than the predefined difference threshold, then the single particle comprises an aspherical particle.

Example 5 includes the system of Example 4, wherein: the optical response peak is resampled based on the airspeed of the vehicle; based on the measured amplitude of the optical response peak, an expected optical response peak shape for a water droplet is generated using the calibration table; and a shape of the resampled optical response peak is compared with the expected optical response peak shape.

Example 6 includes the system of Example 5, wherein: other identified peak parameters are used to enhance particle type classification accuracy, including a peak curve being present within a 1-sigma/2-sigma/X-sigma limit of expected water droplet optical response, or analyzing a peak symmetry.

Example 7 includes the system of any of Examples 1-6, wherein the system: collects optical response data from multiple measurements of individual particles; and determines a particle classification by statistical analysis of optical response peak duration and optical response peak amplitude data.

Example 8 includes the system of Example 7, wherein: a two-dimensional histogram is generated, where a first axis describes optical response peak amplitude, and a second axis describes optical response peak duration; and a variance of optical response peak duration for each histogram column of optical response peak amplitude is calculated.

Example 9 includes the system of Example 8, wherein: if a difference between an expected variance for water droplets and calculated values of variance is below a defined threshold, then the particles comprise water droplets; if the difference between an expected variance for water droplets and calculated values of variance is above the defined threshold, then the particles comprise aspherical particles.

Example 10 includes the system of any of Examples 8-9, wherein: the variance of each histogram column is compared with expected variance values for water droplets, ice crystals, and volcanic ash/sand/dust particles; and based on a difference of measured variance and the expected variance for each particle type, the system generates a probability for each type of particle, and determines a most probable type of particle.

Example 11 includes the system of any of Examples 8-10, wherein the processor uses the optical response peak duration and the optical response peak amplitude of the two-dimensional histogram as an input into a computer model, including an expert system, a probabilistic model, or a machine learning system, wherein the computer model is operative to determine a most probable particle type.

Example 12 includes the system of any of Examples 8-11, wherein: the processor generates features describing a two-dimensional data distribution of optical response peak duration and optical response peak amplitude, and propagates these features into a computer model, which also takes as an input other features, including depolarization signal parameters; wherein the computer model uses all existing input features to determine a most probable particle type.

Example 13 includes a method comprising: transmitting a light beam from a light source on a vehicle, to an interrogation region outside of the vehicle; receiving, in an optical detector on the vehicle, scattered or reflected light from an aerosol particle in the interrogation region outside of the vehicle; measuring an optical response from the aerosol particle in the interrogation region by identifying an optical response peak of the scattered or reflected light from the interrogation region, and resampling the optical response peak based on a value of an airspeed of the vehicle; measuring an amplitude, duration and shape of the resampled optical response peak; based on the measured amplitude of the optical response peak, generating an expected optical response for a water droplet using a calibration table, and the duration and shape of the optical response peak; analyzing the measured optical response and the expected optical response to determine a particle classification of the aerosol particle; and generating a probability value for a particle type of the aerosol particle.

Example 14 includes the method of Example 13, wherein the particle classification of the aerosol particle is determined by a process comprising: calculating a difference value between the measured duration of the optical response peak and an expected optical response peak duration; and comparing the difference value to a predefined difference threshold to determine the particle classification.

Example 15 includes the method of Example 14, wherein: if the difference value is less than the predefined difference threshold, then the aerosol particle comprises a water droplet; if the difference value is greater than the predefined difference threshold, then the aerosol particle comprises an aspherical particle.

Example 16 includes the method of any of Examples 14-15, wherein: other identified peak parameters are used to enhance particle type classification accuracy, including a peak curve being present within a 1-sigma/2-sigma/X-sigma limit of expected water droplet optical response, or analyzing a peak symmetry.

Example 17 includes the method of any of Examples 13-16, further comprising: collecting optical response data from multiple measurements of individual particles; and determining a particle classification by statistical analysis of optical response peak duration and optical response peak amplitude data.

Example 18 includes the method of Example 17, further comprising: generating a two-dimensional histogram, where a first axis describes optical response peak amplitude, and a second axis describes optical response peak duration; and calculating a variance of optical response peak duration for each histogram column of optical response peak amplitude.

Example 19 includes the method of Example 18, wherein: if a difference between an expected variance for water droplets and the calculated variance is below a defined threshold, then the particles comprise water droplets; if the difference between an expected variance for water droplets and the calculated variance is above the defined threshold, then the particles comprise aspherical particles.

Example 20 includes the method of any of Examples 18-19, wherein: the variance of each histogram column is compared with expected variance values for water droplets, ice crystals, and volcanic ash/sand/dust particles; and based on a difference of measured variance and the expected variance for each particle type, generating a probability for each type of particle, and determining a most probable type of particle.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:
a particle sensor assembly for a vehicle, the particle sensor assembly comprising:
a light source configured to direct a light beam to an interrogation region outside of the vehicle; and
an optical detector configured to receive scattered or reflected light from an aerosol particle in the interrogation region; and
a processor in operative communication with the optical detector;
wherein the processor hosts a module that includes program instructions, executable by the processor, to perform a method for particle classification comprising:
measuring an optical response from a single particle in the interrogation region by a process comprising:
identifying an optical response peak for scattered or reflected light from the interrogation region;
measuring an amplitude and duration of the optical response peak; and
correcting the duration of the optical response peak based on an airspeed of the vehicle;
based on the measured amplitude of the optical response peak, generating an expected optical response duration for a water droplet using a calibration table;
analyzing the measured optical response duration and the expected optical response duration to determine a particle classification; and
generating classification probabilities for one or more particle types.

2. The system of claim 1, wherein the particle classification comprises water droplets, ice crystals, volcanic ash, sand, or dust.

3. The system of claim 1, wherein the particle classification of the single particle is determined by a process comprising:

calculating a difference value between the measured duration of the optical response peak and an expected optical response peak duration; and comparing the difference value to a predefined difference threshold to determine the particle classification.

4. The system of claim 3, wherein:

if the difference value is less than the predefined difference threshold, then the single particle comprises a water droplet;

if the difference value is greater than the predefined difference threshold, then the single particle comprises an aspherical particle.

5. The system of claim 4, wherein:

the optical response peak is resampled based on the airspeed of the vehicle;

based on the measured amplitude of the optical response peak, an expected optical response peak shape for a water droplet is generated using the calibration table; and a shape of the resampled optical response peak is compared with the expected optical response peak shape.

6. The system of claim 5, wherein:

other identified peak parameters are used to enhance particle type classification accuracy, including a peak curve being present within a 1-sigma/2-sigma/X-sigma limit of expected water droplet optical response, or analyzing a peak symmetry.

7. The system of claim 1, wherein the system:

collects optical response data from multiple measurements of individual particles; and determines a particle classification by statistical analysis of optical response peak duration and optical response peak amplitude data.

8. The system of claim 7, wherein:

a two-dimensional histogram is generated, where a first axis describes optical response peak amplitude, and a second axis describes optical response peak duration; and a variance of optical response peak duration for each histogram column of optical response peak amplitude is calculated.

9. The system of claim 8, wherein:

if a difference between an expected variance for water droplets and calculated values of variance is below a defined threshold, then the particles comprise water droplets;

if the difference between an expected variance for water droplets and calculated values of variance is above the defined threshold, then the particles comprise aspherical particles.

10. The system of claim 8, wherein:

the variance of each histogram column is compared with expected variance values for water droplets, ice crystals, and volcanic ash/sand/dust particles; and based on a difference of measured variance and the expected variance for each particle type, the system generates a probability for each type of particle, and determines a most probable type of particle.

11. The system of claim 8, wherein the processor uses the optical response peak duration and the optical response peak amplitude of the two-dimensional histogram as an input into a computer model, including an expert system, a probabilistic model, or a machine learning system, wherein the computer model is operative to determine a most probable particle type.

12. The system of claim 8, wherein:

the processor generates features describing a two-dimensional data distribution of optical response peak duration and optical response peak amplitude, and propagates these features into a computer model, which also takes as an input other features, including depolarization signal parameters;

wherein the computer model uses all existing input features to determine a most probable particle type.

13. A method comprising:

transmitting a light beam from a light source on a vehicle, to an interrogation region outside of the vehicle;

receiving, in an optical detector on the vehicle, scattered or reflected light from an aerosol particle in the interrogation region outside of the vehicle;

measuring an optical response from the aerosol particle in the interrogation region by identifying an optical response peak of the scattered or reflected light from the interrogation region, and resampling the optical response peak based on a value of an airspeed of the vehicle;

measuring an amplitude, duration and shape of the resampled optical response peak;

based on the measured amplitude of the optical response peak, generating an expected optical response for a water droplet using a calibration table, and the duration and shape of the optical response peak;

analyzing the measured optical response and the expected optical response to determine a particle classification of the aerosol particle; and generating a probability value for a particle type of the aerosol particle.

14. The method of claim 13, wherein the particle classification of the aerosol particle is determined by a process comprising:

calculating a difference value between the measured duration of the optical response peak and an expected optical response peak duration; and comparing the difference value to a predefined difference threshold to determine the particle classification.

15. The method of claim 14, wherein:

if the difference value is less than the predefined difference threshold, then the aerosol particle comprises a water droplet;

if the difference value is greater than the predefined difference threshold, then the aerosol particle comprises an aspherical particle.

16. The method of claim 15, wherein:

other identified peak parameters are used to enhance particle type classification accuracy, including a peak curve being present within a 1-sigma/2-sigma/X-sigma limit of expected water droplet optical response, or analyzing a peak symmetry.

17. The method of claim 13, further comprising:

collecting optical response data from multiple measurements of individual particles; and determining a particle classification by statistical analysis of optical response peak duration and optical response peak amplitude data.

18. The method of claim 17, further comprising:

generating a two-dimensional histogram, where a first axis describes optical response peak amplitude, and a second axis describes optical response peak duration; and calculating a variance of optical response peak duration for each histogram column of optical response peak amplitude.

19. The method of claim 18, wherein:

if a difference between an expected variance for water droplets and the calculated variance is below a defined threshold, then the particles comprise water droplets;

if the difference between an expected variance for water droplets and the calculated variance is above the defined threshold, then the particles comprise aspherical particles.

20. The method of claim 18, wherein:

the variance of each histogram column is compared with expected variance values for water droplets, ice crystals, and volcanic ash/sand/dust particles; and based on a difference of measured variance and the expected variance for each particle type, generating a probability for each type of particle, and determining a most probable type of particle.

\* \* \* \* \*